United States Patent [19]
Wagner

[11] Patent Number: 5,657,844
[45] Date of Patent: Aug. 19, 1997

[54] SYNCHRONIZATION DEVICE FOR GEAR SHIFT MECHANISMS

[75] Inventor: Dagobert Wagner, Pürgen, Germany

[73] Assignee: Hoerbiger & Co., Im Forchet, Germany

[21] Appl. No.: 571,224

[22] Filed: Dec. 12, 1995

[30] Foreign Application Priority Data

Dec. 13, 1994 [AT] Austria ................................. 2321/94

[51] Int. Cl.$^6$ ................................................. F16D 23/06
[52] U.S. Cl. ............................ 192/53.32; 192/53.341
[58] Field of Search ..................... 192/53.32, 53.34, 192/53.341, 53.342, 53.343

[56] References Cited

U.S. PATENT DOCUMENTS

| | | | |
|---|---|---|---|
| 2,328,205 | 8/1943 | Flinn | 192/53.34 |
| 3,631,952 | 1/1972 | Sugimoto et al. | 192/53.342 |
| 4,805,755 | 2/1989 | Fukumoto et al. | 192/53.32 |
| 5,135,087 | 8/1992 | Frost | 192/53.32 X |

*Primary Examiner*—Richard M. Lorence
*Attorney, Agent, or Firm*—Watson Cole Stevens Davis, P.L.L.C.

[57] ABSTRACT

A synchronization device for gear shaft mechanisms includes an outer synchronization ring which is formed as a deep-drawn plate section which is toothed on its outer perimeter to correspond to locking cogs of a clutch sleeve and a coupler. The outer synchronization ring has a conical friction surface in its middle area and locking tabs on its inner circumference in a deep-drawn bottom area thereof. The locking tabs provide a form-locked solid coupling with a synchronizer which has mating recesses which open outward radially and extend inward radially from an outer periphery of the synchronizer. A dimensionally exact and simple manufacturing of the outer synchronizing ring is provided in very few work steps enabling the synchronization device to be attractive for many uses which were previously avoided due to cost.

4 Claims, 3 Drawing Sheets

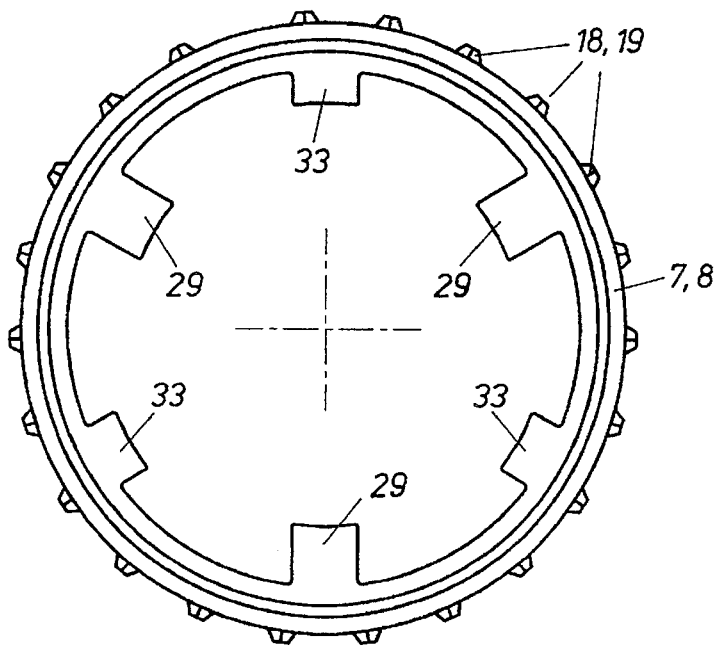
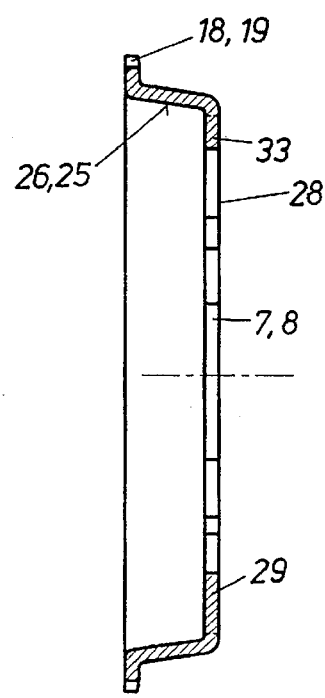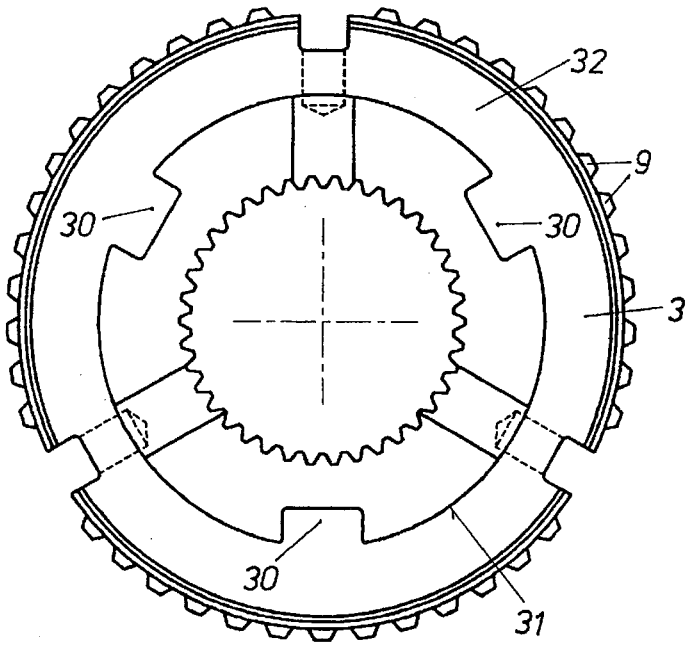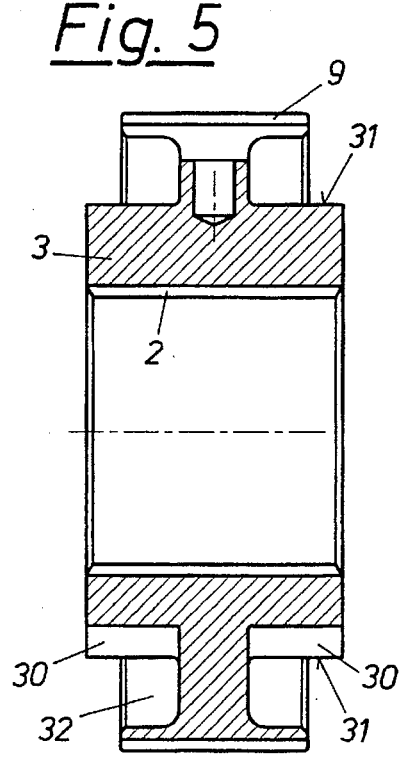

SYNCHRONIZATION DEVICE FOR GEAR SHIFT MECHANISMS

FIELD OF THE INVENTION

The present invention pertains to a synchronization device for gear shift mechanisms comprising an essentially pulley-shaped synchronizer mounted solidly to a gear shaft which has a clutch sleeve mounted on its outer perimeter. At least one rotating drive gear is mounted on the gear shaft which can be coupled to the synchronizer solidly through a coupler by means of the clutch sleeve. The coupler can frictionally connect with the synchronizer by means of a friction ring with at least one conical friction surface which is form-locked with the coupler, and an outer synchronizing ring, form-locked to the synchronizer wherein the coupler is engaged and disengaged through the operation of the clutch sleeve. The outer synchronizing ring is toothed on its outer perimeter coinciding with the locking cogs of the clutch sleeve and the coupler, and also has a conical friction surface.

BACKGROUND OF THE INVENTION

A device of the previously described type is known, for example, from EP-A1 508,976 and from U.S. Pat. No. 5,135,087. Such devices make servicing the gear shift mechanism easier and also diminishes wear. The disadvantage with the known methods in making such devices is that the manufacturing precision required for satisfactory performance of the device, particularly for the frictional components working in tandem at synchronization, demands for the most part many working steps. As a result, such methods are undesired and often leave the aforementioned type of synchronization device avoided for cost reasons.

The problems, which to this point oppose the use of known deep-drawing methods in connection with such existing devices, particularly in the manufacture of the outer synchronizing ring, revolve around the fact that the locks required on the outer synchronizing ring to connect it form-locked to the synchronizer, as well as the cogging for tandem operation with the locking cog of the clutch sleeve and coupler, were arranged on the outside of the outer synchronizing ring. This made additional working steps necessary for attainment of the required precision and manufacture. These additional steps offset the cost advantages of deep-drawing compared in and of itself, for example, with injection die casting and subsequent fine machining. For example, DE-A1 3,519,811 discloses an outer synchronizing ring in which the locks for fixation to a coupler are constructed of lugs which are provided on the outer perimeter. The ring can only be manufactured with expensive additional steps using non-cutting cold forming. Similar difficulties exist as well in the arrangement known from DE-C2 3,519,810 in which the locks are constructed by an additional expensive axial compression process. In both cases, a calibration must additionally be undertaken, since the cold forming techniques used do not provide the necessary precision for the end product.

SUMMARY OF THE INVENTION

It is an object of the present invention to construct a synchronization device which is an improvement over the above-mentioned types, such that the mentioned disadvantages of the known devices can be avoided and the cost of manufacturing can be reduced without a loss of quality. This objective is met according to the present invention by providing a device of the above-named type which is improved such that the outer synchronizing ring is constructed as a deep-drawn plate section which has punched-out locking tabs on its inner perimeter in the area of the capped bottom. The tabs provide for a form-locked, solid connection with the synchronizer and mate with recesses of the synchronizer.

According to the present invention, a deep-drawing process is used to make a high degree of dimensional precision possible without additional calibrating procedures, wherein the locking tabs punched-out in the cupped bottom region of the plate section formed for the manufacture of the outer synchronizing ring have on the one hand high mechanical rigidity, and on the other hand, have the required precision in orientation and dimensioning after the forming process. In this way, by a very simple and cost-effective means for the manufacture of the outer synchronizing ring, the key can be found which makes this important component of the synchronization device considerably cheaper than the known types of outer synchronizing rings, and thus more widely applicable.

According to a preferred embodiment of the invention, the recesses of the synchronizer are formed from notches running outwardly in the direction parallel to the axis on the surface of a lateral cut-out of the pulley-shaped synchronizer. This cut-out is occupied by at least portions of the friction ring and the outer synchronizing ring. A simple manufacture of the synchronizer as well as a simple and space-saving total arrangement of the synchronizing device is thus made possible.

A synchronizing device with an additional inner synchronizing ring working in tandem with the inner side of the conical friction ring is provided for a double-synchronization in a further preferred embodiment of the invention, wherein the locking tabs mate with cut-outs in the inner synchronizing ring. This ring is thus coupled with the synchronizer by means of the outer synchronizing ring. What results is a very simple construction of a type of double synchronization device, which finds preferred use particularly for high clutch loads.

According to yet another embodiment of the present invention, the outer synchronizing ring and/or the inner synchronizing ring can also have a friction coating on its, or their, sides working in tandem with the friction ring whereby the possibilities for applications are further increased. The friction coating can be applied by known methods either before the final forming of the respective synchronizing ring or afterwards, wherein known techniques can be used.

BRIEF DESCRIPTION OF THE DRAWINGS

The present invention is explained in more detail with reference to the design examples partially represented schematically in the attached drawings, wherein

FIGS. 2 and 3 show the outer synchronization ring from FIG. 1 in a plan view and section view, respectively;

FIGS. 4 and 5 show the associated synchronizer again in a plan view and section view, respectively.

DETAILED DESCRIPTION OF THE INVENTION

Figure 1:
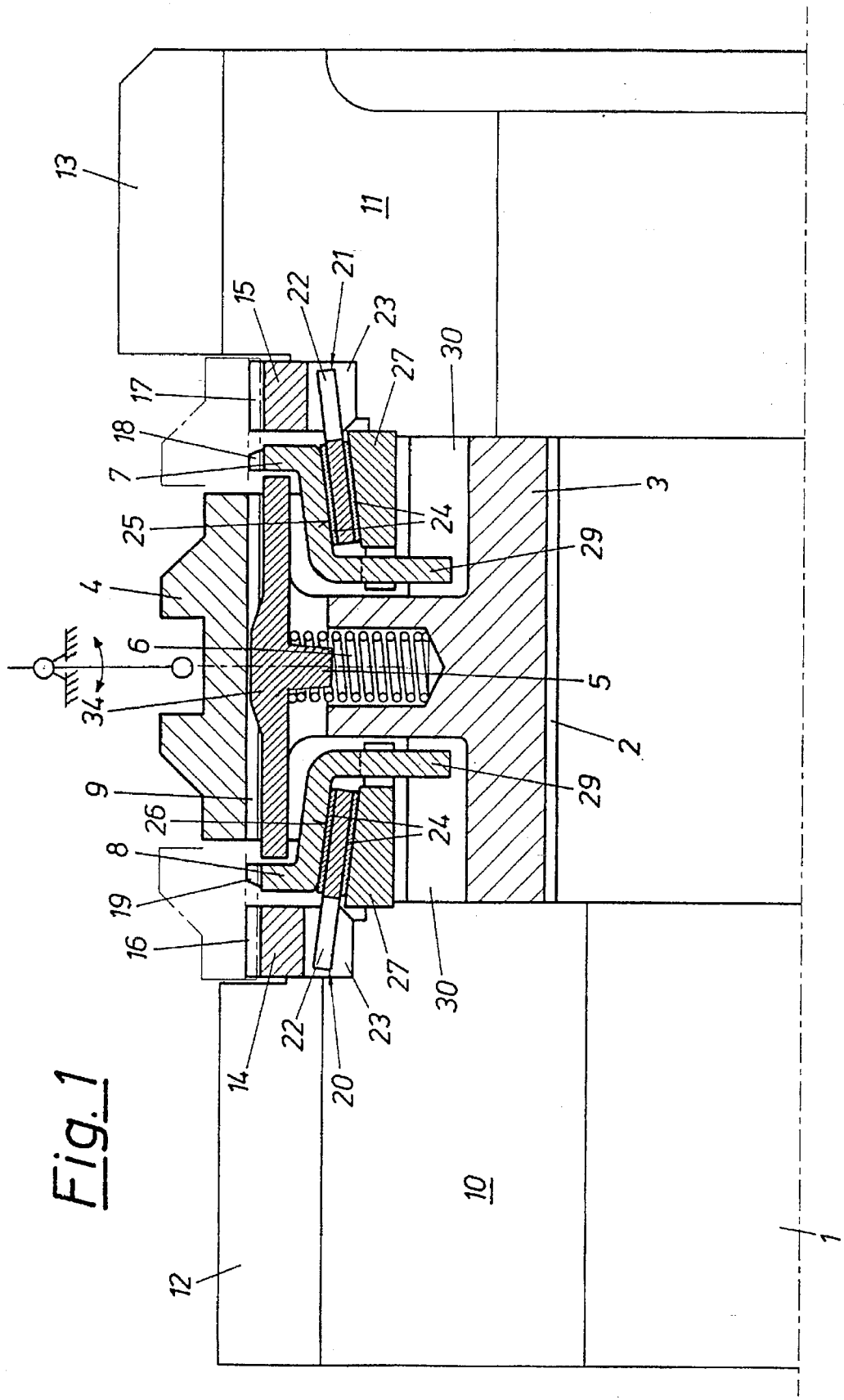
FIG. 1 shows a section through a double-synchronization device constructed according to the present invention.

The synchronization device according to FIG. 1 has a synchronizer 3 mounted solidly on a gear shaft 1 by means by a spline 2, and is provided with a clutch sleeve 4 on its outer perimeter with which a shift lever 35 mates. The clutch sleeve 4 is provided with a spring limiter consisting of a pin 5 and a spring 6, whereby the pin 5 acts to center the spring 6 relative to a thrust ring 34. Further, on each side of the synchronizer 3 is a respective outer synchronizing ring 7, 8, which is toothed on its outer perimeter to correspond to inner locking cogs of the clutch sleeve 4. Drive gears 10 and 11 are mounted on the gear shaft on both sides of the synchronizer 3 and are freely turnable. Each drive gear 10, 11 has a cog 12, 13, respectively, on its outer perimeter. Bound to each of the drive gears 10, 11 is a respective circular coupler 14, 15 on the side facing the synchronizer 3. Each coupler is provided with outer cogs 16, 17, which work in tandem, as do the outer cogs 18, 19 of the respective outer synchronizing rings 7, 8 with the inner locking cogs of the clutch sleeve 4 upon corresponding displacement of the clutch sleeve 4 via a pivotable lever 35 to the positions indicated with dotted lines in FIG. 1.

The two couplers 14, 15 sit solidly form-locked or force-locked (for example, through splining, laser welding, etc.) on corresponding lands of the drive gears 10, 11, respectively, and are connected to the synchronizer 3 through a friction coupling which can be engaged or disengaged as needed. The couplers include a friction ring 20, 21 having locking tabs 22 which extend outwardly from the side of the friction ring which is largest in diameter. The locking tabs mate with recesses 23 in each associated coupler 14, 15. As shown in FIG. 1, the locking tabs 22 extend straight out from the conical surfaces of the friction ring 20, 21. The locking tabs can also be bent, for example, nearly perpendicular to the outside wherein the bent section then mates with the associated recess of the coupler 14, 15. The friction rings 20, 21 are provided on each conical outer and inner surface with a sintered friction coating 24 which works in tandem with the corresponding conical friction or coupling surfaces 25, 26 of the associated outer synchronizing rings 7, 8. The coating 24 also works with the additional inner synchronizing ring 27.

The outer synchronizing rings 7, 8, as particularly shown in FIGS. 2 and 3, are constructed as deep-drawn plate portions which have formed on their outer perimeters the respective outer cogs 18, 19, which correspond to the locking cogs 9 of the clutch sleeve 4 and the outer cogs 16, 17 (respectively) of the couplers 14, 15. In the middle area the conical friction surface or coupling surface 25, 26 is provided. On the inner perimeter, punched-out locking tabs 29 are provided in the deep-drawn floor area 28 and are intended for a form-locked solid bond with the synchronizer 3. The locking tabs mate with the recesses 30 of the synchronizer 3 (FIG. 4).

The recesses 30 of the synchronizer 3 (detailed more closely in FIGS. 4 and 5) are formed from perimeter notches running outwardly in the axial parallel direction on the surface 31 of a lateral cut-out 32 of the pulley-shaped synchronizer 3. The cut-out is occupied by at least portions of the respective friction ring 20, 21 and the respective outer synchronizing ring 7, 8 in the assembled state of the arrangement.

The locking tabs 29 as well as the shorter coupling tabs 33 of the outer synchronizing rings 7, 8 (FIG. 2) mate form-locked with corresponding cut-outs of the inner synchronizing ring 27 (FIG. 1). Inner synchronizing ring 27 is likewise coupled to the synchronizer 3 through the outer synchronizing rings 7, 8, resulting in an advantageous so-called double-synchronization.

In operating the arrangement represented in FIG. 1, the synchronizer 3 turns with the gear shaft 1, whereby the two drive gears 10, 11 can freely turn relative to the gear shaft 1 and to the synchronizer 3. If the clutch sleeve 4 is thrust against one of the drive gears 10, 11 by overcoming the limiter (formed by the pin 5 and spring 6), for example against drive gear 11, the outer synchronizing ring 7 moves along with it by means of the thrust ring 34. The thrust ring 34 thus causes engagement of the friction surface 25 of ring 7 with the friction coating 24 of friction ring 21. The coupling surface 25 of ring 7 is engaged after only a short travel distance of thrust ring 34. Thus, the friction ring 21 is displaced somewhat to the right in the illustration, so that also the opposite friction coating 24 on the inside of friction ring 21 comes into contact with the inner synchronizing ring 27 in a friction-locked manner. A matching or synchronization of the rotating speed of the two synchronizing rings 7, 27, that is, of the synchronizer 3 coupled with them by means of the locking tabs 29, and the drive gear 13, results. As soon as the rotating speeds coincide, the clutch sleeve 4 can mate with the outer cog 17 of the coupling element 15 and thus create a final form-locked solid coupling between the gear shaft 1 and the drive gear 11.

The corresponding coupling to the left drive gear in FIG. 1 results analogously by displacement of the clutch sleeve 4 to the left.

The punched-out locking tabs 29 in the deep drawn floor area 28 of the formed plate portion for manufacture of the outer synchronizing ring 7, 8 provide, on the one hand, high mechanical stiffness and, on the other hand, have the required orientation in dimensioning precision after formation. Thus, by simple and economical means, the solution can be found in the production of the outer synchronizing rings 7, 8. Thus, this important component of the synchronization apparatus can be manufactured significantly cheaper and also find more wide range utility compared to outer synchronizing rings known from the prior art.

Each of the outer synchronizing rings 7, 8 can be made as a simple deep-drawn design part. In addition, a friction covering could also be provided on the coupling surface area 25 as well, which is also true of the coupling surface 26 on the outer perimeter of the inner synchronizing ring 27. The possibilities for use are thus even further increased. Such friction coverings could be applied by methods known in and of themselves either before the final forming of the respective synchronizing ring or afterwards, whereby known techniques can be used.

Figure 6:
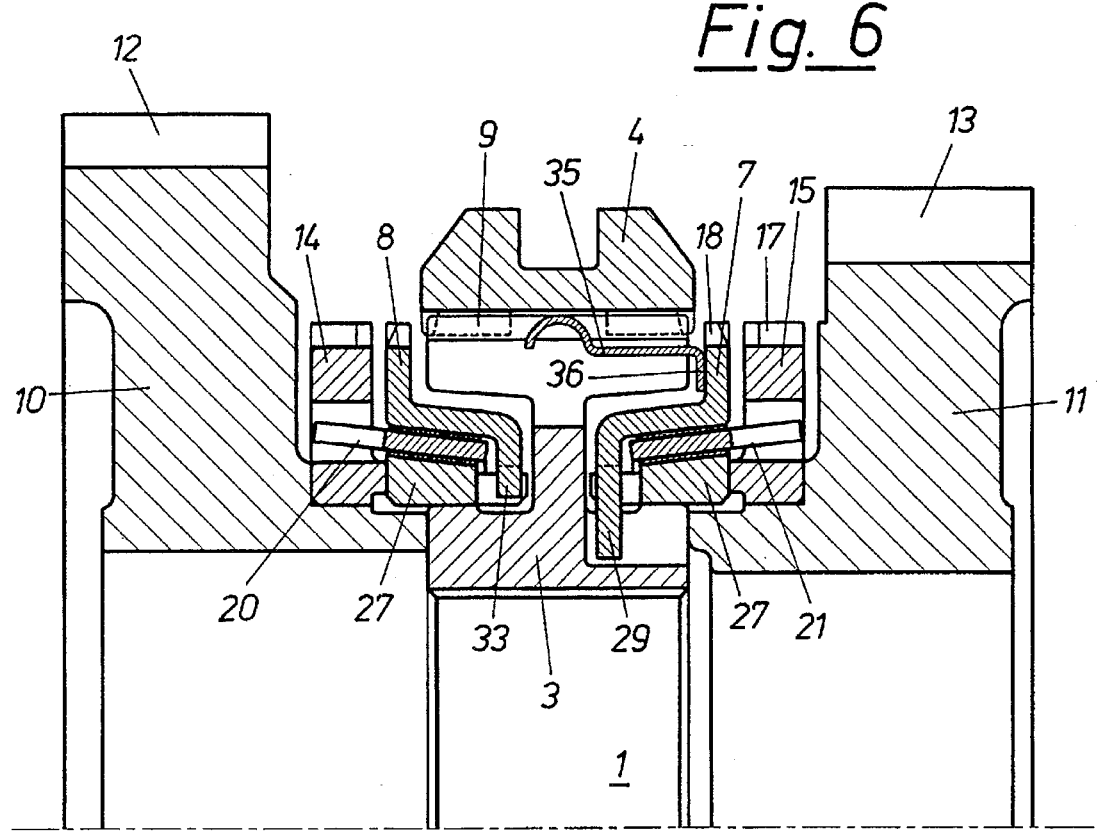
FIG. 6 shows another design example of the present invention in a representation corresponding to FIG. 1.

The synchronization apparatus represented in FIG. 6 is similar in fashion to that of FIG. 1 and is manufactured to be essentially equal or very similar to the one shown in FIG. 1. Equal or functionally equal components are depicted using the same reference numerals as used in the description of FIG. 1. With reference to the construction and the functionality of the synchronization device according to FIG. 6, the above design in FIG. 1 and also in FIGS. 2–5 is referred to in order to avoid repetition.

The synchronization device according to FIG. 6 has a circular spring 35 in place of the limiting spring which consists of pin 5 and spring 6 in FIG. 1. Such is the single most important difference between the two embodiments. The spring 35 takes on the function of the limiting spring component described in FIG. 1. Upon displacement of the clutch sleeve 4 to the right, the outer synchronizing ring 7 is engaged to the right by edge 36 of the circular spring 35, which is thus pulled inward. For the sake of clarity, the required circular spring for displacement to the left is not represented. The engagement of the synchronization results through the friction ring 21 in a similar manner as described with reference to FIG. 1. This leads, after equalization of the rotational speeds, to the final form-locked coupling between the gear shaft and the right drive gear 11 shown in FIG. 6.

Although the present invention has been described in connection with preferred embodiments, it will be appreciated by those skilled in the art that additions, modifications, substitutions and deletions not specifically described may be made without departing from the spirit and scope of the invention defined in the appended claims.

What is claimed is:

1. A synchronization device for gear shift mechanisms, said device comprising:

a disc-shaped synchronizer mounted to a rotatable gear shaft for rotation therewith;

a clutch sleeve mounted on an outer circumference of said synchronizer;

coupling means;

at least one rotating drive gear mounted on the gear shaft for rigid coupling to the synchronizer through said coupling means when in an operative position;

an outer synchronizing ring form-locked to the synchronizer and being engageable and disengageable through operation of said clutch sleeve; and means for displacing said clutch sleeve into and out of said operative position, wherein said coupling means includes said clutch sleeve which engages said synchronizer and said drive gear when in an operative position and has recesses therein for receiving locking tabs of the outer synchronizing ring, and is frictionally connected to said synchronizer by means of a friction ring having at least one conical friction surface which is form-locked with the coupling means, wherein said outer synchronizing ring has a conical friction surface and is toothed on its outer perimeter to coincide with locking cogs on said clutch sleeve and on said coupling means, and is formed as a deep-drawn plate section which has punched-out locking tabs on its inner perimeter in a deep-drawn area of said outer synchronizing ring, and wherein said punched-out locking tabs provide a form-locked rigid coupling to the synchronizer provided by a mating relationship between said locking tabs and said recesses.

2. A synchronization device as defined in claim 1, wherein said recesses of the clutch sleeve are formed as radial notches running in the axial parallel direction on a surface of a lateral cut-out of the substantially pulley-shaped synchronizer, wherein said lateral cut-out is in the form of a recess between an inner perimeter and an outer perimeter of said synchronizer and accommodates at least a portion of said friction ring and at least a portion of said outer synchronizing ring.

3. A synchronization device as defined in claim 1, further comprising an inner synchronization ring working in tandem with an inner side of the friction ring having at least one conical friction surface, wherein the locking tabs rigidly mate with recesses in said inner synchronization ring which is in turn coupled with the synchronizer through said outer synchronizing ring.

4. A synchronization device as defined in claim 1, wherein at least one of said outer synchronization ring and said inner synchronization ring has a side working in tandem with said friction ring and includes a friction coating.

* * * * *